Nov. 16, 1965   RENÉ LEMOINE ALIAS   3,217,496
                   ROBERT RENÉ
                 TELECOMMAND DEVICE
Filed Sept. 24, 1962                    4 Sheets-Sheet 1

INVENTOR

Rene alias R. Lemoine

BY *Wenderoth, Lind & Ponack*

ATTORNEYS

Nov. 16, 1965
RENÉ LEMOINE ALIAS ROBERT RENÉ
TELECOMMAND DEVICE
3,217,496
Filed Sept. 24, 1962
4 Sheets-Sheet 2
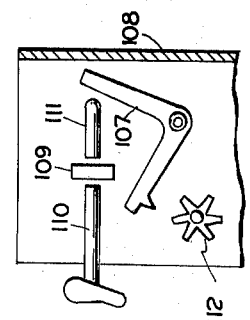
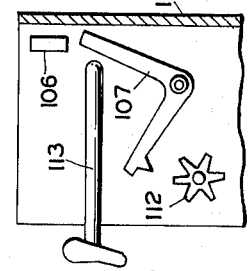
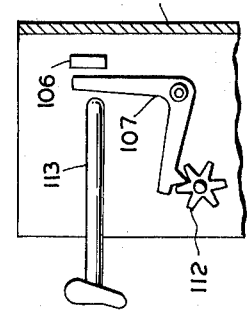
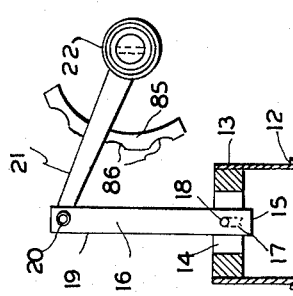
INVENTOR
*Rene alias R. Lemoine*
BY *Wenderoth, Lind & Ponack*
ATTORNEYS Nov. 16, 1965  RENÉ LEMOINE ALIAS  3,217,496
ROBERT RENÉ
TELECOMMAND DEVICE Filed Sept. 24, 1962  4 Sheets-Sheet 3

INVENTOR

Rene alias R. Lemoine

BY *Wenderoth, Lind & Ponack*

ATTORNEYS

Nov. 16, 1965  RENÉ LEMOINE ALIAS  3,217,496
ROBERT RENÉ
TELECOMMAND DEVICE
Filed Sept. 24, 1962  4 Sheets-Sheet 4

INVENTOR
Rene alias R. Lemoine

BY Wenderoth, Lind & Ponack
ATTORNEYS

United States Patent Office 3,217,496
Patented Nov. 16, 1965

3,217,496
TELECOMMAND DEVICE
René Lemoine alias René Robert, 60 Rue Caulain Court, Paris, France
Filed Sept. 24, 1962, Ser. No. 225,461
8 Claims. (Cl. 60—62.5)

The present invention concerns a telecommand device applicable to locking and bolting elements. It applies more particularly to simultaneous or successive bolting and unlocking of any number of various locks of doors or other elements of any terrestrial, nautical or aerial vehicle, or of furniture, water gates, etc. and any number of any other mechanical elements capable of being locked or unlocked.

Some telecommand devices consist of one emitting volumetric element capable of deformation and as many receiving volumetric elements as any number of existing locks, or any other members, to be locked or unlocked. A conduit system filled with liquid connects the emitting volumetric element to the receiving volumetric elements. These devices utilize the development of the receiving volumetric elements under pressure of liquid generated by the crushing of the emitting volumetric element.

Each receiving volumetric element acts in force on the bolt or any other part of the lock, so as to put it in a locking or unlocking condition.

These devices present important disadvantages making difficult, if not impossible, their realization from a technical as well as economic point of view. The powerful action of the emitting volumetric element of a circuit limits the number of its receiving volumetric elements as well as the length of the conduits interconnecting them. Moreover, another basic disadvantage thereof is that this powerful action requires a great effort on the driving key of the barrel connected to the emitting volumetric element, which effort renders difficult the manipulation of the key eventually causing it to break.

Furthermore, the liquid used for the command transmission deteriorates more or less rapidly the emitting volumetric element, as well as the receiving volumetric elements which are directly in contact with the liquid.

This invention remedies these disadvantages and seeks to provide a telecommand device, more particularly applicable to bolting or unbolting members of any vehicle in which the receiving volumetric elements do not act in force on any of the elements of said members.

Air, only, or any other gas, is directly in contact with the receiving volumetric elements and with the emitting volumetric element.

When mounting, the whole circuit is first placed in depression, i.e. submitted to a pressure lower than the ambient atmospheric pressure, so that the resting position of the emitting volumetric elements is a completely compressed position or self-collapsed, while each receiving volumetric element is in its position of normal development, i.e. in its position of maximum internal volume.

The receiving volumetric elements as well as the emitting volumetric element, are made in a like manner of a supple and elastic material, with the difference, however, that the thickness of the wall of the emitting volumetric member, and especially its internal volume, are superior to those of each receiving volumetric element, the volume of the emitting volumetric element being itself much bigger than the total volume of the whole of the receiving volumetric elements.

For example, satisfactory results may be obtained where the walls of the receiving volumetric elements measure 0.4 mm. in thickness, while those of the emitting volumetric element measure 1.5 mm., the ratio between the thicknesses of the walls of the two types of volumetric elements thus being superior to three. Similarly, satisfactory results may be obtained where the receiving volumetric element has a volume of 5 to 8 cubic millimeters, while the emitting volumetric element has a volume of 35 to 56 cubic centimeters.

The connection of the emitting volumetric element to each receiving volumetric element is made by a conduit system having, preferably, the general form of a U, so as to establish a level of liquid in the branches of the U. This arrangement leaves the volumetric elements out of any contact with the liquid capable of deteriorating such elements.

Each receiving volumetric element is connected to a piston interfering very freely between two pieces, without any powerful action:

Either as a wedge being placed between an active mechanical part and a fixed one of the lock, so as to lock it;

Or as an additional member sliding between two active mechanical parts of a lock or any other mechanism, to ensure a continuity between these two parts which, being united, may, for example, actuate a bar permitting the opening of the lock, or intervene on said mechanism.

Any expansion of the volumetric elements produced by an increase of elevation is counteracted by a valve provided in the emitting volumetric element.

This valve places, for some time, the device at the ambient atmosphere, and this as soon as the emitting volumetric element is voluntarily completely crushed.

However, when the emitting volumetric element is free to revert to its initial position after crushing, the valve is closed up and the development of the volumetric element which tends to come back to its initial position is expressed by the replacement of the device in depression with reference to the new ambient atmosphere, as required by the invention.

The telecommand device in accordance with the invention, may consist of any number of emitting volumetric elements located at places separated one from the other, each of them capable of being driven separately and provoking the function of the whole of the receiving volumetric elements contained in said device.

The invention will be described further, by way of example, with reference to the accompanying drawings, in which:

FIGS. 5 and 6 are diagrammatic views explaining the closing and the opening of a lock by a device having a movable stop or wedge;

FIGS. 7 and 8 are diagrammatic views explaining the opening and the closing of a lock by means of an additional member;

FIG. 9 is a partial section showing a telecommand device in accordance with the invention;

The telecommand device, shown in FIGS. 1 to 4, consists of a supple and elastic emitting volumetric element 8 and a supple and elastic receiving volumetric element 28, connected together by a conduit 3. Conduit 3 has been provided with an exhaust outlet E. When a pressure P is exerted on the emitting volumetric element 8, FIG. 2, a portion of the air contained in the enclosure constituted by the emitting volumetric element 8, receiving volumetric element 28 and its conduit 3, escapes from the outlet E (arrow $f1$). When the crushing of emitting volumetric element 8 is stopped, FIG. 2, while maintaining the pressure which has permitted the achievement of this degree of crushing, the device remains in equilibrium as in FIG. 1, the pressure prevailing in the interior of the circuit being that of the exterior.

Figure 3:
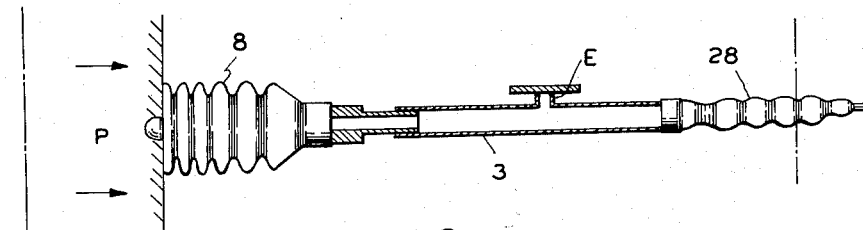

The degree of crushing of element 8 being thus maintained, the outlet E, FIG. 3, is shut off.

Figure 1:
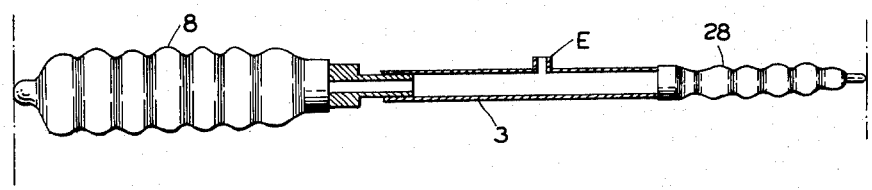
FIGS. 1 to 4 are diagrammatic views explanatory of the principle of the invention.
Figure 4:
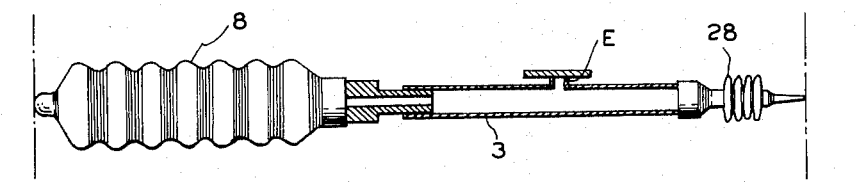

As soon as the pressure P has ceased to be exerted on emitting volumetric element 8, FIG. 4, outlet E being shut off, receiving volumetric element 28 contracts owing to the expansion of emitting volumetric element 8 which tends to return to its initial position shown on FIG. 1, a depression being thus made in the interior of the device.

The contracted condition of receiving volumetric element 28, FIG. 4, corresponds in accordance with the invention to its resting condition.

It will be well understood that if pressure P is again exerted on emitting volumetric element 8, FIG. 3, the removal of the air contained in the device is expressed by an expansion of receiving volumetric element 28, FIG. 3, facilitated by its flexibility and elasticity (the normal shape of this element is that shown in FIGS. 1 to 3), and being exerted in the same direction.

Figure 2:
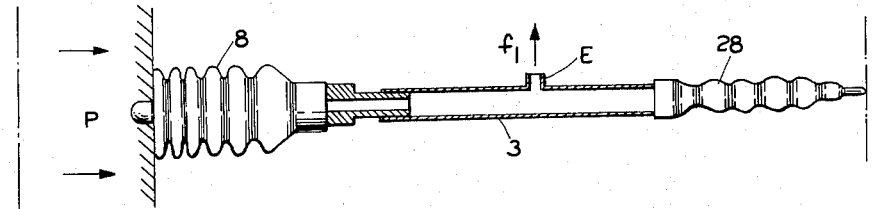

The well known devices which do not function in previous depression, provoke an expansion of the emitting volumetric element, tending to deform it beyond its initial shape shown in FIGS. 1 to 3.

A telecommand device (FIG. 9), consists of an emitting volumetric element 8 and several receiving volumetric elements 28, two of which only are effectively illustrated for the sake of clarity in the drawing.

The circuit connecting emitting volumetric element 8 to one of the receiving volumetric elements 28 is a circuit in the shape of a U in which a liquid has been previously introduced, so as to realize a liquid level between the branches of this U. Above this level are placed the emitting volumetric elements 8 and receiving volumetric elements 28, the whole of which is simply filled with air or any other suitable gas. The liquid is at the same level as in all the elementary U's constituting the telecommand device. When emitting volumetric element 8 reverts to its normal development condition, the level in the branch of the U ending thereat rises in N'—N', while the levels of each of the receiving volumetric elements 28 descend in N—N, levels of the whole of the receiving volumetric elements 28 remaining thus in the same plane.

The volumetric elements are thus not directly in contact with a liquid capable of causing rapid deterioration thereof, and moreover the liquid contained in the U constitutes a liquid plug, the function of which is to transmit to each receiving volumetric element the incitement of emitting volumetric element 8. Emitting volumetric element 8 and receiving volumetric elements 28 thus always preserve their same mechanical qualities. They are preferably made of latex, rubber or gutta percha. These materials are chosen in view of their satisfactory behaviour at high and low temperatures.

The preservation of the volumetric elements is also improved in that, owing to their utilization, they are always in a position protected from light and in a slightly damp atmosphere. An internal damp atmosphere results from the presence of the liquid plug, which may be alcoholized water to avoid freezing. The liquid plug furthermore prevents the maintenance in the device of too important a volume of air, which may vary with the temperature and the altitude.

Inasmuch as the device in FIG. 9 may have any number of receiving volumetric elements 28, it may also have any number of emitting volumetric elements 8. That is the reason why a second emitting volumetric element 8 is schematically shown in dotted lines on this figure. It is obvious that the whole of the receiving volumetric elements 28 function in a like manner when one or the other of the emitting volumetric elements 8 is crushed.

Figure 11:
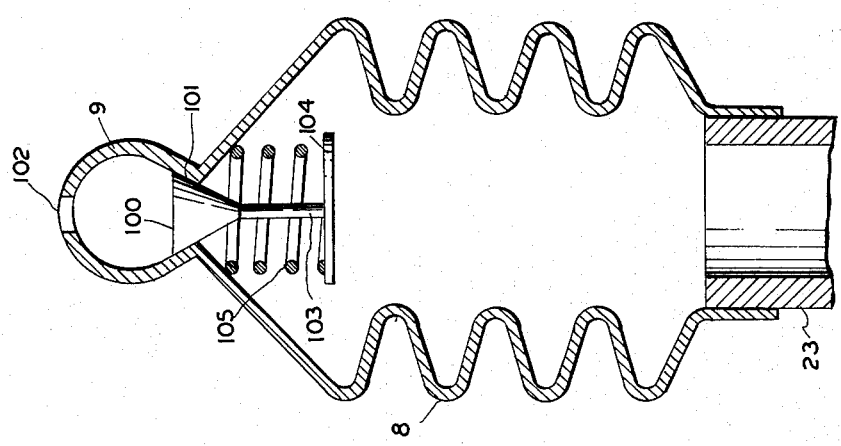
FIG. 11 is a sectional elevation, on an enlarged scale, of an emitting volumetric element provided with an altitude valve.

In order to remedy the effects of altitude, when its fluctuations cannot be compensated by the dilatation of volumetric elements 8 and 28, a valve may be provided in emitting volumetric element 8, as shown in FIG. 11. This valve is made in such a manner as to be maintained closed as long as emitting volumetric element 8 is not completely crushed. It is constituted, in accordance with one embodiment of the invention, by a cone-shaped head 100 resting on a corresponding seat 101 and formed by the end appendix of emitting volumetric element 8, which is pierced by a hole 102.

A rod 103 connects the head 100 to a tray shaped end plate 104 on which a spring 105 is interposed between element 8 and the tray. The spring 105 keeps the valve closed. When volumetric element 8 is completely crushed, plate 104 abuts against the discharge tube 23 of the volumetric element which produces the lifting of head 100, against the spring 105 and thus the getting up of the pressure of the device to the ambient atmospheric pressure by the intermediary of the hole 102.

When the crushing of volumetric element 8 has ceased, the valve closes as soon as plate 104 leaves the tube 23, and the device is again in a condition of depression with reference to the ambient atmospheric pressure as volumetric element 8 tends to return to its initial condition.

Each receiving volumetric element 28 actuates a piston which constitutes either a movable wedge capable of being inserted very freely between an active mechanical part and a fixed part of the lock, or an additional part sliding very freely between two active mechanical parts of a lock.

In FIGS. 5 and 6, the piston of a receiving volumetric element 28 is a movable stop or wedge 106 capable of being very freely inserted between the lever 107 and a fixed member 108 integral with the lock. In the position shown in FIG. 5, where the stop or wedge 106 is effectively inserted between lever 107 and member 108, lever 107 is blocked upon a cam 112, and the command push-button 113 it itself rendered immovable. In the position shown in FIG. 6, where the wedge is in a retracting position, push-button 113 can drive lever 107, which permits the opening of the lock.

In FIGS. 7 and 8, the piston of a receiving volumetric element 28 is an additional member 109 capable of sliding very freely between two parts 110 and 111 of a command push-button actuating lever 107. In the position shown in FIG. 7, the command push-button, namely members 110 and 111 and the additional member 109 sliding between said members, constitute a push-button capable of effectively driving lever 107 permitting the opening of the lock. On the contrary, member 110 alone, in FIG. 8, where the additional piece 109 is no longer between members 110 and 111, cannot actuate lever 107, preventing thus the opening of the lock.

To summarize:

The interposition of wedge 106 between the command lever 107 and the fixed member 108 prevents the opening of the lock and maintains it bolted (FIG. 5), while the retracting of the wedge 106 permits its opening (FIG. 6);

The interposition of the additional member 109 between the two pieces 110 and 111 permits the opening of the lock (FIG. 7) while its retracting prevents the opening of the lock and maintains it bolted (FIG. 8).

In any case, neither the wedge 106, nor the additional member 109, exerts any effort, so that no power is required on the part of the telecomand device to effectively command any number of receiving volumetric elements 28. In the movable stop or wedge 106, two modes of realization are hereafter described with reference to FIGS. 12 and 13.

According to the mode of realization shown in FIG. 9, the telecommand device comprises a casing constituted by a driving cylinder 1 connected with receiving elements constituted by cylinders 2 by means of a conduit 3 made of a supple or rigid material if need be.

The device may comprise several like emitting volumetric elements 8, all connected in a like manner with the same conduit 3. They work in the same way, and permit the command of the whole of the receiving volumetric elements 28 starting from places separated one from the other.

A second emitting volumetric element is schematically indicated in dotted lines on FIG. 9.

The cylinder 1 which has the general shape of a pump, consists of tube 4, advantageously made of light alloy, the bottom of which has a circular opening 6 in which is engaged the discharge tube 7 of a deformable volumetric casing emitter 8 constituting a tight receptacle disposed in the said interior of said tube 4 and which is preferably made of a supple and elastic material such as latex, plastic matter, rubber or supple metal. The volumetric casing emitter 8, the length of which is slightly lower than the length of the tube 4, and which may be cording to need, be subjected also to the action of a spring, has an enlargement or protuberance 9 at its upper closed end, engaged with force in an orifice 10 of a diameter smaller than the enlargement 9 made in the bottom 11 of a hollow piston 12, which is itself engaged with great tolerance in the interior of the tube 4 and thus is mounted and guided to-and-fro in it. The piston 12 may also be fabricated in light alloy. The upper end of this piston is closed by a washer 13, the centre of which presents a hollowing cut-out 14 in which is engaged one end 15 of a driving rod 16. A cut-out 17 is made perpendicularly to the cut-out 14 and has an axle 18 engaged in the end 15 of the rod 16 so as to realize a mobile line-connection between these two elements.

The other end 19 of the rod 16 is coupled by an axle 20 with an arm 21 advantageously mounted upon the key-channel barrel 22 of a lock. This key-channel barrel 22 may have several predetermined positions, due to a segment 85 having a certain number of bosses 86 designed to immobilize arm 21 in several angular positions corresponding to various states of deformation of the volumetric emitter 8. These different states of deformation of the volumetric emitter 8 are utilized to obtain a selective functioning of receiving volumetric elements 28, of suitable volume and thickness.

Discharge tube 7 of emitting volumetric element 8, in which is normally mounted conduit 3, may be, according to the particular applications as shown on the drawing, threaded on a connection 23 having a mouth-piece 24 of a smaller diameter, on which is then engaged conduit 3, made of supple material the nature of which, as well as that of the volumetric casing emitters, is determined with reference to particular applications.

Conduit 3 ensures the displacement of the fluid in volumetric casing emitter 8 (itself contained in the command cylinder 1), to one or several receiving volumetric elements constituted by cylinders 2 which may be disposed at various distances from cylinder 1. Conduit 3, the ends of which are hermetically closed by the receiving volumetric element 28 of a cylinder 2, has L-shaped or T-shaped connections 26 at intervals along its length to which connections the receiving cylinders 2 are connected.

Figure 10:
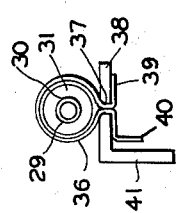
FIG. 10 is a sectional elevation of an element of the device comprising a receiving volumetric element, which view is taken on the line IX—IX of FIG. 9.

The cylinder-receivers 2 are constituted, on a smaller scale, in the same manner as the cylinder 1 (see FIG. 10). They have a cylindrical casing 27, rigid or semi-rigid, intended, as in cylinder 1, to absorb mechanical shocks in certain applications, and to serve as a guide for a receiving volumetric element 28. This element 28 is preferably made of elastic material, and is disposed in the interior of said casing 27. One of its ends has the aspects of a supple tube 29, and is engaged in an orifice 30 provided in the bottom 31 of said casing 27.

The volumetric receiving member 28 has at its other end a protuberance 32 integral with the bottom 33 of a hollow piston 34 engaged with a large tolerance in cylinder 27. This piston 34, forming a wedge in the lock, has internally at the opposite end of the bottom 33 and forcibly inserted, a thick ring 34a designed to withstand the crushing efforts.

The cylinder-receivers 2 are integral with a corner 35 by means of a collar 36 surrounding cylinders 27 and engaged in a slit 37 made in one of the flanges 38 of said corner.

The two ends 39 and 40 of the collar 36 are folded, as shown in FIG. 10, after retraction to ensure the tightening of cylinder body 27.

The corner has, moreover, on its wing 41, two holes 42 and 43 permitting its adaptation to the body of the lock. It is however obvious that the process of adaptation of the cylinder 27 by means of a collar 36 may be realized directly on the body of the lock.

According to the mode of realization hereabove described the installation constitutes an entirely closed circuit. It has been found advantageous for this reason to make the walls of the emitting volumetric element 8 in a material thicker than the walls of the volumetric receiving members so as to obtain an automatic return without the use of a spring.

Figure 12:
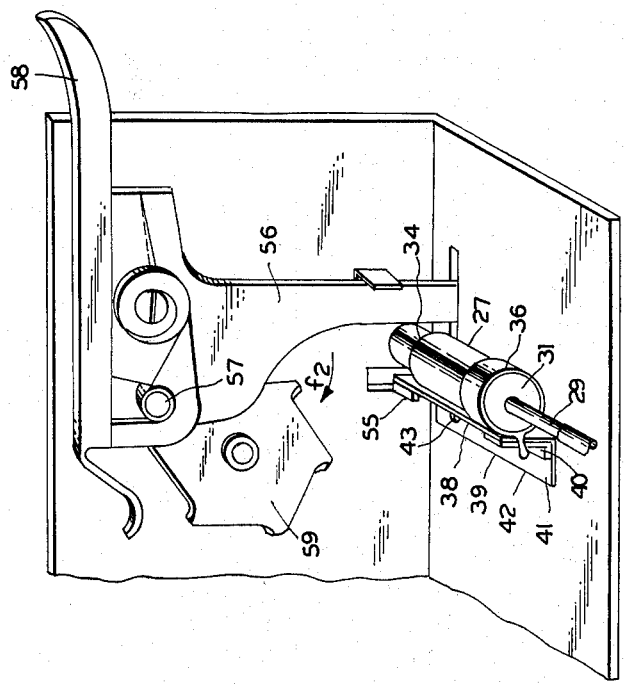
FIG. 12 is a perspective view showing the application of the device to the lock of any vehicle providing a stop or wedge.

FIG. 12 illustrates one of the non-limitative positions of the receiving cylinder 2 mounted as bolting element.

It is well understood according to the above specification, that the closing of the key-channel barrel 22 produces, through arm 21 and rod 16 the displacement of piston 12, which has for effect to compress the emitting volumetric element 8. This deformation of the emitting volumetric element 8 generates a displacement of fluid transmitted by the conduit 3 to the receiving volumetric element 28 of receiving cylinder 2, the length of which increasing in reference to this displacement, ensures the displacement of piston 34.

Piston 34, so pushed, is thus placed in between an adjustable stop 55 and a lever 56 provided with a stopper 57, thus blocking the movement in the direction of the arrow f2 of said lever, normally caused by saddle 58 with a view to free cam 59 and thus to permit the opening of the lock.

Figure 13:
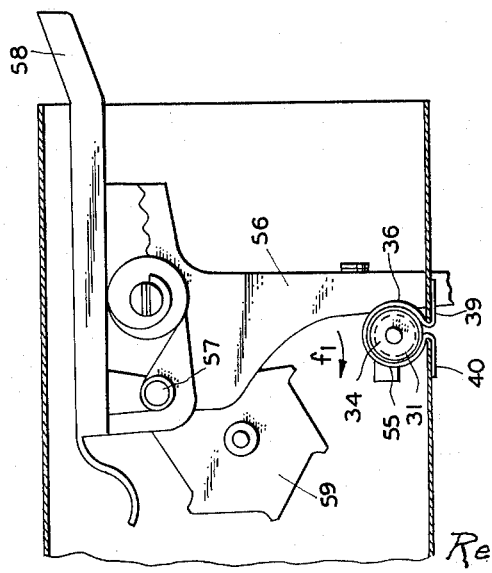
FIG. 13 is an elevation showing a variation of this application.

FIG. 13 illustrates a variation in the mounting of the bolting element in which the corner of fixation has been omitted.

According to this variation, the two ends 39 and 40 of collar 36, destined to the maintenance of the receiving cylinder, are engaged in a slit made in the body of the lock and bent after traction in the same manner as for the fixation on the corner.

Although a large number of other applications of the hereinbefore described device, may be envisaged, it is particularly interesting to make use of it to ensure the simultaneous bolting of the doors of an automobile vehicle and if desired also of the trunk hoods, petrol tank, etc. In this application, the command may be made by hand, for instance by one key-channel barrel as described with reference to FIG. 1, or if desired automatically. This second automatic command being superposable to the first, it has been found desirable that a bolting of the doors be made when the vehicle runs so as to avoid any risk of accident owing to a casual opening of a door.

Figure 14:
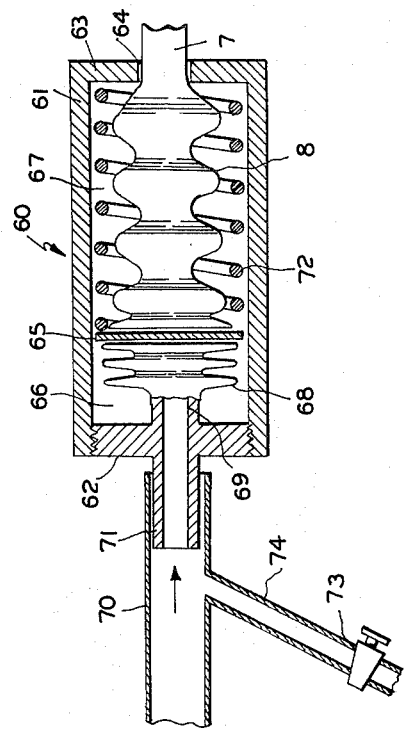
FIG. 14 is a longitudinal section, on a larger scale, of a variation of an element of the device comprising the emitting volumetric element.

FIG. 14 shows an automatic command operated by a distribution member 60 provided with a cylinder 61 closed by a lid 62, the bottom of which 63 has a circular orifice 64.

This cylinder is internally provided with a mobile diaphragm 65 which delimits two chambers 66 and 67. Chamber 66 has a volumetric member 68 made of a supple and elastic material preferably plastic matter, mounted upon a connection 69 on the lid 62. This deformable volumetric member 68 is submitted to the action of oil pressure, generated by the motor of an automobile vehicle and transmitted by a conduit 70, placed on a connection 71 provided on the exterior part of lid 62.

Chamber 67 is used for the housing of volumetric casing emitter 8, FIG. 1, the connection 7 of which is engaged in orifice 64 so as to permit its adaptation on the hereinabove described circuit.

The oil pressure provided by the motor has for effect the deformation of the volumetric casing emitter 68 and consequently the crushing, by means of the diaphragm 65 and against the action of the spring 72, of the volumetric casing emitter 8, the function of which is then similar to that hereinabove described with reference to FIG. 9

The spring 72 opposes itself to the deformation of volumetric casing emitter 68 so as to avoid blocking at a certain oil pressure value, which corresponds to the slow running of the motor of the vehicle.

Cock 73 affords, through its regulation, the possibility of diverting all or part of the oil, so as to obtain a locking only by a predetermined pressure calculated to correspond to a given speed of the motor.

A delayed or staggered action may be obtained between the receiving volumetric elements by giving them a different thickness and volume, so as to obtain a partial or intermediary locking or unlocking, or to introduce a time constant between the functioning of two different receiving volumetric elements.

The key-channel barrel may take several positions of opening and locking, the functioning of some of the receiving volumetric elements corresponding to each position. A last position may be foreseen which will permit a complete crushing of the emitting volumetric element, which complete crushing permits the action of valve 100 in altitude.

In a general way, the hereinabove specification has only been given by way of indication and not limitatively, and a number of variations may be made in conformity with the scope of the invention.

Having thus described my invention, I claim:

1. A telecommand device for the control of locking and bolting elements comprising at least one emitting volumetric element and at least one receiving volumetric element, a conduit connecting said elements, means for maintaining said device, prior to any command, in a state of internal depression with reference to the surrounding atmospheric pressure so that said emitting volumetric element maintains a permanent depression in the device and means for collapsing said emitting volumetric element so that when said emitting volumetric element assumes a completely collapsed position, with its internal volume being at a minimum, said receiving volumetric element assumes a natural resting position of maximum volume with its internal pressure being that of the surrounding atmospheric pressure.

2. A telecommand device as set forth in claim 1, wherein said receiving volumetric element and said emitting volumetric element are made of a supple material, each element being provided with spring means, the spring means of the emitting volumetric element exercising a substantially greater force than the spring means of said receiving volumetric element, so as to increase its own volume to a maximum, creating a depression in said receiving volumetric element, said spring means of said receiving element expanding as soon as said spring means of said emitting volumetric element is compressed by actuating said emitting element.

3. A telecommand device as in claim 1, in which said receiving volumetric element and said emitting volumetric element are made of a supple and elastic material, said receiving volumetric element having walls of substantially uniform thickness, and said emitting volumetric element having walls of substantially greater thickness than that of the walls of said receiving volumetric element.

4. A telecommand device as claimed in claim 3, in which the ratio of the thickness of the walls of said emitting volumetric element to that of the walls of said receiving volumetric element is at least 3 to 1.

5. A telecommand device as claimed in claim 3, wherein there is a plurality of receiving volumetric elements and the volume of said emitting volumetric element is substantially greater than that of said plurality of receiving volumetric elements and of all conduits connecting said emitting volumetric element to said plurality of receiving volumetric elements.

6. A telecommand device as claimed in claim 1, in which a valve is provided in said emitting volumetric element to remedy the effects of altitude, said valve opening when actuated by the end of the conduit to which said emitting volumetric element is connected, at the time when the said emitting volumetric element is voluntarily actuated to cause its internal volume to become minimum to place the device in contact with the ambient atmosphere, the device being automatically replaced in depression with reference to the ambient atmosphere as soon as the emitting element is let free to retake its developed position, wherein said valve becomes automatically closed.

7. A telecommand device as in claim 6, in which when the emitting volumetric element provided with said valve is compressed to a position of minimum internal volume, said valve opens automatically whereby the interior of the device is put in contact with the surrounding atmospheric pressure while the receiving volumetric element assumes a position at rest with a maximum internal volume.

8. A telecommand device as in claim 6, in which a spring is provided, having one end connected to said valve and the other end connected to said emitting volumetric element, said spring being compressed when the valve is open, pushing said valve against said emitting volumetric element, at the time when the emitting volumetric element comes back from its position of minimum internal volume, whereby a depression below the surrounding atmospheric pressure is created within the device, the emitting volumetric element tending to assume a position of maximum internal volume while the receiving volumetric element is in a completely collapsed position with its internal volume at a minimum.

References Cited by the Examiner

UNITED STATES PATENTS

| | | |
|---|---|---|
| 1,342,798 | 6/1920 | Farrand. |
| 1,398,291 | 11/1921 | Arbuckle _____ 60—62.5 |
| 1,805,802 | 5/1931 | Browne. |
| 1,934,206 | 11/1933 | Page _____ 60—54.5 |
| 2,228,674 | 1/1941 | Raymond. |
| 2,459,029 | 1/1949 | Ingres et al. |
| 2,603,963 | 7/1952 | Allen. |

FOREIGN PATENTS 825,731    12/1959    Great Britain.

JOSEPH D. SEERS, *Primary Examiner.*

M. HENSON WOOD, JR., *Examiner.*